United States Patent

[11] 3,586,769

[72] Inventors Arch C. Luther, Jr.
Cherry Hill;
John C. Kmiec, Runnemede, both of, N.J.

[21] Appl. No 774,862
[22] Filed Nov. 12, 1968
[45] Patented June 22, 1971
[73] Assignee RCA Corporation

[54] VIDEO TAPE REPRODUCER SYSTEM HAVING AUTOMATIC STANDARD SELECTION
9 Claims, 2 Drawing Figs.

[52] U.S. Cl. 178/6.6A, 179/100.2
[51] Int. Cl. G11b 5/04, G11b 27/28, H04n 5/78
[50] Field of Search 178/6.6

[56] References Cited
UNITED STATES PATENTS
2,840,800 6/1958 Chester 178/6.6 X

*Primary Examiner*—Bernard Konick
*Assistant Examiner*—S. Pokotilow
*Attorney*—Edward J. Norton

ABSTRACT: A device for automatically providing compatible operation of recorder-reproducer systems which utilize frequency modulation (FM) techniques for recording and reproducing video information according to any one of several FM deviation standards.

INVENTORS
ARCH C. LUTHER, JR. &
JOHN C. KMIEC
BY Edward J. Norton
ATTORNEY

VIDEO TAPE REPRODUCER SYSTEM HAVING AUTOMATIC STANDARD SELECTION

This invention relates to video-tape recorder-reproducer systems which are operable according to several frequency modulation (FM) deviation standards. In particular it concerns a means for automatically providing FM deviation standard compatibility between the systems record-reproduce circuitry and the information recorded on the record medium.

Because of the attendant advantages, frequency modulation (FM) techniques are widely used in video-tape recording. There are however at present, three different frequency modulation (FM) deviation standards utilized in video tape recorder-reproducer systems employed in television broadcasting. The deviation standard in FM recording refers to the requirement that different specific frequencies be utilized in representing particular levels of a composite video waveform. Table I below lists the parameters for the three FM deviation standards referred to above.

TABLE I

| | Blanking (black) level, mHz. | White tip level, mHz. |
|---|---|---|
| Lowband monochrome (LBM) | 5.00 | 6.8 |
| Lowband color (LBC) | 5.79 | 6.5 |
| Highband (HB) | 7.9 | 10.0 |

To provide versatility, many recorder-reproducer systems are made capable of operating at any one time, according to any one of the three FM deviation standards. This however presents a compatibility problem between the operating standard of the record-reproducer system and information which has been or is to be recorded. For example, if information has been recorded according to one standard and an attempt is made to reproduce this information with a system which is disposed to handles a different standard, substantial distortion of the reproduced information may result. In the past, these problems were solved by trail and error operation of the system and/or operator monitoring of certain system parameters. However these methods are susceptible to operator error and require time consuming manual operations before the systems is ready for proper operation. In an age when it is desirable to operate record-reproducer systems by preset computers and from remote locations these solutions are unacceptable.

It is therefore an object of the present invention to automatically provide FM deviation standard compatibility in a video record-reproducer system.

Briefly in accordance with the present invention, the signal frequency of a particular portion of a composite video signal, which is presented in frequency modulated (FM) form, is monitored. Means are provided for discerning which of several possible FM standards are present. The resulting information is used to cause record-reproduce operation which is compatible with the discerned FM standard.

Figure 1:
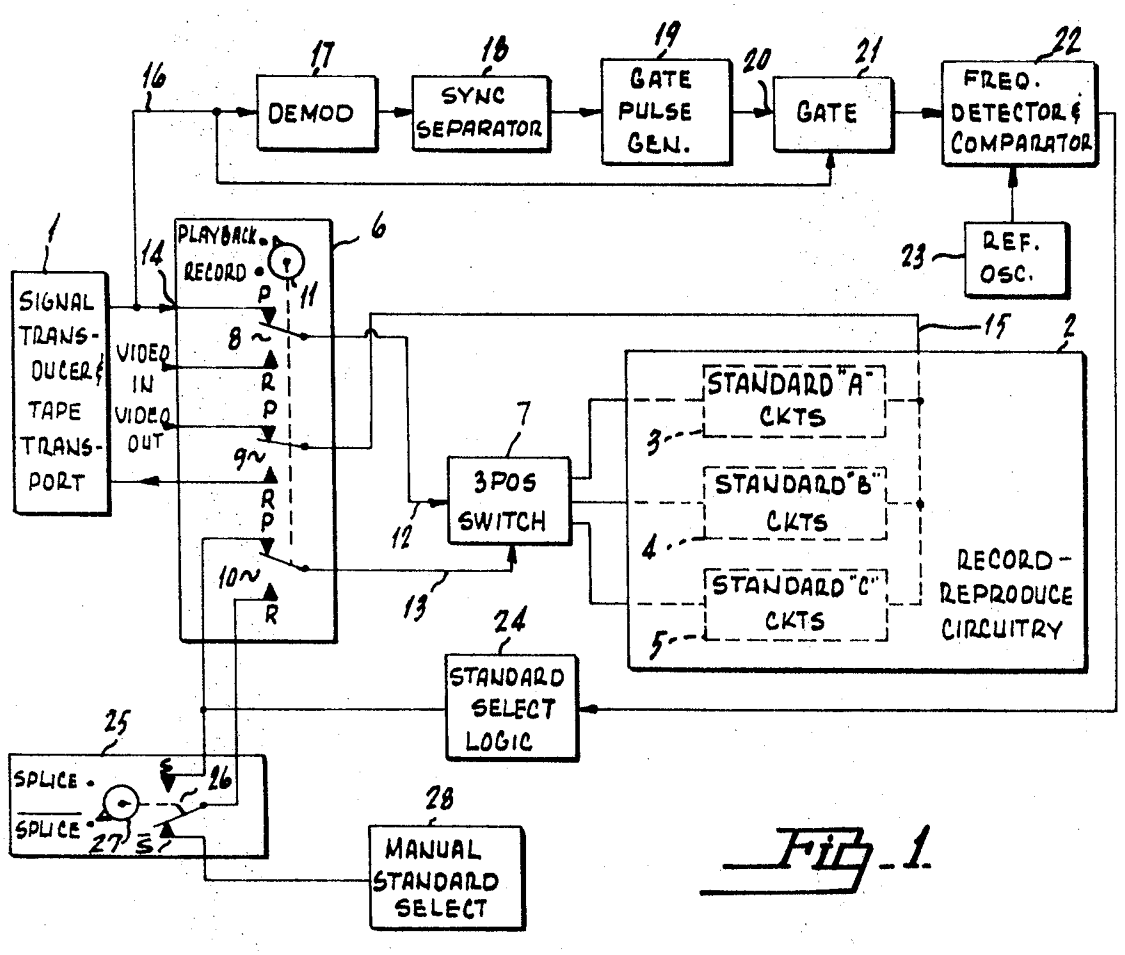
FIG. 1 is a diagrammatic view of a recorder-reproducer system embodying the present invention.

If reference is made to FIG. 1, there is shown a video-tape system which is capable of recording and reproducing video signals utilizing any one of several frequency modulation (FM) standards. Numeral 1 refers to the magnetic tape transport and signal transducer means which exist in modern day recorder-reproducers. For example, block 1 may contain rotary transverse scanning headwheel assembly and transport known as a quadruplex recorder. Alternatively, the block 1 may contain the rotary head assembly and transport arrangement known as a helical recorder, or the transport and stationary head arrangement of a longitudinal recorder. The numeral 2 refers to known record and reproduce circuits, which permit recording and reproducing video signals by means of frequency modulation techniques. In general the circuitry contained in the block 2, is that required for compatible operation with the particular transducer and transport arrangement of the block 1. In particular, the block 2 includes three circuit groups 3, 4, 5. Each of the respective circuit groups 3, 4, 5 contain the necessary circuitry for enabling the system to record and reproduce video utilizing a different FM standard. That is, the block 3 contains the necessary circuitry to record and reproduce video signals utilizing the FM standard "A," which for example is the Lowband Monochrome (LBM) standard. Block 4 contains the circuitry for operation with the FM standard "B," which for example is the Lowband Color (LBC) standard. Block 5 contains the circuitry for operation with the FM standard "C," which for example is the Highband (HB) standard. The inputs of the record-reproduce circuitry of block 2 are coupled to the signal transducer and tape transport of block 1, through a first switching means 6 and a second switching means 7. The switching means 6 consists of switchable elements 8, 9 and 10, each of which has a wiper and two contacts labeled P and R respectively. The switch element 8 when in the playback position P, couples the video signal in frequency modulated encoded form on lead 14 from the signal transducer 1 to input lead input 12. When the switch element 8 is in the record position R, the video which is to be recorded using frequency modulation techniques is coupled to lead 12. The switchable elements 8, 9 and 10 are simultaneously actuated by control means 11, which is used to control the operation of the recorder-reproducer system in either the record or playback mode. The three position switching means 7 couples the input signal on lead 12, through a particular one of the circuit groups 3, 4 or 5 of the record-reproduce circuitry 2. Switching means 7 is controlled by the signal on lead 13. The output of the record reproduce circuitry 2, is coupled to element 9 of switching means 6 by lead 15. When the recorder-reproducer system is in the playback mode, the signal on lead 15 is a demodulated video signal, which is coupled through the contact P of element 9 to the "-video out" terminal of the system. In record mode, the signal on lead 15 is a video signal in frequency modulated form, which is coupled through the contact R of element 9 to the signal transducer of block 1. The playback video in frequency modulated form on lead 14 is also coupled by lead 16 to a frequency demodulation circuit 17. The output of demodulator 17 is coupled to a sync separator circuit 18, whose output is coupled to a gate pulse generating means 19. The output of gate pulse generator 19 is coupled to the control input 20 of the gate 21. The frequency modulated video signal on lead 16 is coupled to a second input of the gate 21. The gated signal at the output of the gate 21 is coupled to one input of a frequency detector and comparator circuit 22. A reference frequency oscillator 23 provides a second input to the circuit 22. The output of circuit 22 is coupled to the input of standard select logic circuitry 24. The output of the circuitry 24 is coupled through the playback contact P of switch element 10 to the control lead 13 of switching means 7. A third switching means 25 provides addition mode control of the record-reproducer system. Switching 25 contains a switchable element 26 consisting of a wiper and two contacts labeled S and S corresponding to the splice and nonsplice modes. The element 26 is controlled by the control means 27. A manual standard select means 28, which is capable of producing suitable control signals for the switching means 7, is coupled to the S contact of switch element 26. The S contact of element 26 is coupled to the P contact of switch element 10. The wiper of element 26 is coupled to the R contact of switch element 10. Although particular mechanical type switching means have been shown or described for the switching means 6, 7 and 25, it is to be understood that other suitable mechanical or solid state switching means may be utilized.

For purposes of simplicity and clarity, the operation of the recorder-reproducer system of FIG. 1 which embodies the present invention, will be described in terms of its operating modes. For present consideration of the playback mode of operation, it is assumed that a composite video signal has been previously FM recorded on a record medium of the block 1 and is available for playback. It may also be assumed that the FM standard used to record the video information is not known, and it is therefore uncertain which of the circuits 3, 4 or 5 of block 2 should be utilized to properly reproduce the video information. The mode control 11 is in the playback position as shown, and the mode control 27 is in the "not splice" position as shown. The signal transducer and tape transport 1 provides a composite video signal in frequency modulated form on the leads 14 and 16. The composite FM video signal on lead 16 enters the demodulator 17 where it is converted to a demodulated analog form as shown in FIG. 2.

Figure 2:
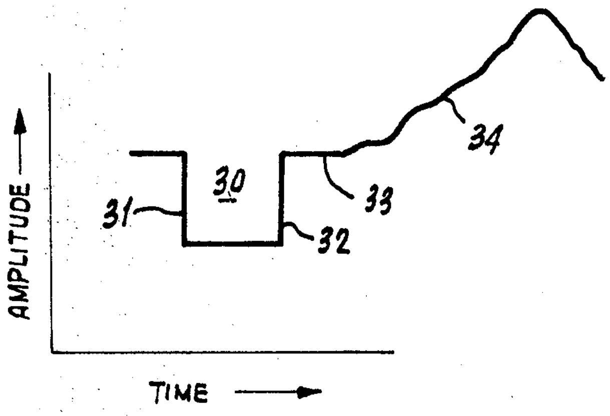
FIG. 2 is a waveform diagram which is helpful in understanding the operation of the present invention.

In FIG. 2, the numeral 30 refers to the horizontal synchronizing pulse having a leading edge 31 and a trailing edge 32. Contiguous with the trailing edge 32 is a reference level 33, known in the art as the "back porch" which is the black or blanking level of the video. Numeral 34 refers to the active video portion of the composite waveform. In FM recording, it is the "back porch" level 33 that must correspond to a particular frequency, dictated by the particular FM deviation standard being used to FM record the video information. That is, for Lowband Monochrome (LBM) the level 33 corresponds to 5.00mHz. For Lowband color (LBC) the level 33 corresponds to 5.79mHz. For Highband (HB) the level 33 corresponds to 7.9mHz. Therefore in accordance with the present invention this correspondence may be discerned, and used to indicate the particular standard used in FM recording a given portion of video information.

Returning to the operation of the system of FIg. 1, the demodulator 17 is made to be capable of demodulating the FM video regardless of which of the standards was used in FM recording the information. Following demodulation, the sync separator 18 removes the horizontal synchronizing signal portion from the balance of the composite video signal. Suitable circuitry for performing the demodulation and sync separation operations indicated, are well known in the art and therefore need not be discussed at length herein. For example, such circuitry is shown and described in "TR-70 Television Tape Recorder-Video and FM System Maintenance" pgs. 96—99, 210—245, Instruction Book IB 32113, RCA Corporation (MAY 1968).

In response to horizontal synchronizing pulse whose leading and trailing edges possesses a distinct time relation to the "back porch" portion of the composite video signal, the gate pulse generator 19 produces a timing or gate control pulse. The gate control pulse out of the circuit 19 is such that it is present in time, during the "back porch" portion of the composite signal. The gate control pulse at terminal 20 of the gate 21, causes the gate 21 to pass the portion of the FM video signal on lead 16 that corresponds to the "back porch" level. In the Frequency detector and comparator 22, the FM signal corresponding to the "back porch" is examined with respect to a reference frequency provided by the reference frequency oscillator 23. While the frequency of the oscillator 23 may be any frequency, for purposes of simplified logic, the oscillator 23 frequency is preferably made to be approximately equal to 5.79 mHz., which is the Lowband Color FM standard for the "back porch" portion of the composite video signal. The frequency detector and comparator 22 produces an output signal, whose magnitude and polarity are indicative of the frequency of the " back porch" portion of the FM video signal on lead 16 relative to the frequency of reference oscillator 23. In the present embodiment, this output will be indicative that the frequency of the "back porch" portion of the FM video signal, is substantially the same as, greater or less than the Lowband Color frequency standard oscillator 23. The standard select logic circuitry 24, which may be existing mechanical or solid state logic means, is configured to respond to the amplitude and polarity of the frequency information output of the frequency detector and comparator 22. For reasons that will become apparent by later discussion, the standard select logic circuitry is preferably of the latchable or memory type. That is, a type which will continue to produce a logic output corresponding to the latest of the three possible frequency information conditions presented to it by the frequency detector and comparator 22, although such information is no longer present at the output of the circuit 22.

The standard select logic circuitry 24 senses which of the three conditions are present, and provides an output signal which is suitable for placing the switching means 7 in a particular one of its three operating positions. For example, in the present embodiment, if a frequency equality of the "back porch" frequency and the reference oscillator 23 is sensed, the standard select logic 24 will cause the switching means 7 to couple the signal on lead 12 to the standard "B" circuits 4 of the record-reproduce circuitry 2. The standard "B" circuits are those required for proper processing of the video signal according to the Lowband Color FM standard. For the condition where the "back porch" frequency is less than the reference frequency of oscillator 23, the output of logic circuit 24 causes switching means 7 to couple the signal on lead 12 to the standard "A" circuits 3, which are suitable for operation of the record-reproduce system according to the Lowband Monochrome FM standard. For the condition where the "back porch" frequency is greater than the reference frequency of oscillator 23, the output of logic circuit 24 causes switching means 7 to couple the signal on lead 12 to the standard "C" circuits 5, which are suitable for operation of the record-reproduce system according to the Highband FM standard. Although separate circuits for operation of the system according to each FM standard are shown, it is to be understood that redundancy among the portions of the record reproduce circuitry which are not FM standard dependent, may be eliminated by providing selection among only the FM standard dependent circuitry.

When the record-reproducer system FIG. 1 is to be operated in the record mode without splicing, the mode control 11 is placed in the "record" position and the mode control 27 remains in the "not splice" position as shown. In this arrangement the wiper of element 10 of switching means 6 engages the R contact. Control of switching means 7 is thereby transferred from the standard select logic circuitry 24 to the manual standard select circuitry 28. This permits the system operator to control the coupling of the signal to be recorded on lead 12 to the desired FM standard circuit of the record-reproduce circuitry 2. While not shown in the drawing for reasons of clarity, it is to be understood that the standard circuits 3, 4, 5 will include suitable switching or routing circuitry for operating the respective circuits 3, 4 and 5 in either the record or playback mode in accordance with the nature of the signals fed thereto from the three-position switch 7. Such switching means may in practice be locked for simultaneous operation with and as a part of the record-playback switch 11 of FIG. 1 to ensure proper orientation of the standard circuits 3, 4, 5 for signal to be processes.

It is often desireable to supplement existing recorded video information or splice in portions of differing video information on a given record medium. When such operations are to be performed, it is usually desirable to record the new video information according to the same FM standard used to record the balance of the video information already recorded. Where this is to be done, the mode control 27 is placed in the "splice" mode. The mode control 11 is initially placed in the "playback" mode. During this initial period of playback operation, the system operates as described above for the playback mode. That is, the standard select logic circuitry 24 senses the standard used to record the information being played back, and causes the information to be processed through the proper standard circuitry of the block 2. When the portion of the recorded information is reached where the new video information is to be added, the mode control 11 is placed in the "record" mode. This mode switching may be accomplished manually by the operator or by automatic means not shown but which are well known. As previously indicated, the standard select logic circuitry 24, is preferably the latchable or memory type. This enables the logic circuitry 24 to continue to provide a control signal to switching means 7 through the switch element 26, although the "back porch" frequency signal is no longer available for FM standard determination. The input lead 12 thereby remains coupled to the particular FM standard circuitry of block 2, which is compatible with the FM standard of the existing recording video information. Thus the FM standard of the recording of the new video information, is made to automatically coincide with whatever FM standard was used for the preceding video information on the record medium.

What we claim is:

1. A system responsive to a frequency modulated signal in which one of a number of predetermined frequencies is utilized to represent a given level of a composite video signal, comprising:

means for separating the portion of said frequency modulated signal corresponding to said given level;

means for determining the frequency of said separated signal relative to a given frequency; and means responsive to the result of said comparison for indicating which of the predetermined frequency values corresponding to said given level is present in said frequency modulated signal.

2. In a video recorder-reproducer system having means for playing back information which has been recorded in frequency modulated form according to one of a plurality of frequency modulation deviation standards, said playback means including individual portions each of which is effective in playing back information recorded according to a different one of said standards, the combination comprising:

means for determining the frequency of a given portion of said frequency modulated signal; and means coupled to said frequency determining means for causing a particular one of said playback portions to be active in playing back said information.

3. In a video recorder-reproducer system having means for playing back video information recorded in the form of a frequency modulated signal according to one of a plurality of frequency modulation deviation standards, said playback means including individually selectable portions each of which is effective in playing back information recorded according to a different one of said standards, the combination comprising:

means for separating a desired portion of said frequency modulated signal;

means for comparing the frequency of said separated signal to a given frequency to provide an indication of the frequency difference between said signals; and means responsive to said indicated frequency difference for controlling the selection of a certain one of said playback portions for playing back said information.

4 The combination according to claim 3, wherein said first means includes:

means responsive to said frequency modulated signal for demodulating said frequency modulated signal;

means responsive to said demodulated signal for generating a control signal corresponding in time with a particular portion of said frequency modulated signal; and gating means responsive to said frequency modulated signal for isolating a portion of said frequency modulated signal in response to said control signal.

5. The combination according to claim 3, wherein said second means includes:

frequency generating means for providing a signal of a given frequency; and frequency difference detecting means coupled to said frequency generating means and said signal separating means for providing an output indicative of a frequency difference if any between said input signals.

6. In combination; a video recorder-reproducer device operable to transduce composite video signal information in frequency modulation form according to predetermined frequency deviation standards, said composite video information including horizontal synchronizing pulses having a trailing edge reference level, the playback means of said recorder-reproducer device having individual selectable portions, each of said portions being suitable for playing back said video information according to a different one of said frequency deviation standards, a demodulator responsive to said video information in frequency modulated form for providing said information in demodulated signal form, means coupled to said demodulator for separating the horizontal synchronizing signal portion of said demodulated signal, means responsive to said separated signal for generating a gate control signal which is present during the reference level portion of said composite video signal information, gating means coupled to said video signal in frequency modulated form and responsive to said gate control signal for separating the portion of said frequency modulated video signal representing said reference level, an oscillator for providing a signal of a given frequency, frequency difference detecting means coupled to said gating means and said oscillator to provide an output indicative of a frequency difference if any between said oscillator frequency and the frequency of said reference level, logic means coupled to the output of said frequency difference detecting means for providing a selection control signal in accordance with the detection of the frequency of said reference level as representing a particular one of said frequency deviation standards, and means responsive to said selection control signal for causing a particular playback portion of said device to be active in playing back said video information.

7. In a video recorder-reproducer system operable to transduce composite video signal information in frequency modulation form according to any one of several predetermined frequency deviation standards, said system including record and playback means each of which have individual selectable portions, each of said portions being suitable in transducing said video information according to a different one of said frequency deviation standards, the combination comprising:

means responsive to said video information recorded in frequency modulated form for providing an output indicative of a frequency difference if any between the frequency of a particular portion of said frequency modulated information and a given frequency;

logic means responsive to the output of said last means for providing a control signal in accordance with the detection of the frequency of the particular portion of said recorded signal as representing a particular one of said frequency deviation standards; and means responsive to said control signal for causing a particular record portion of said system to be active when next recording video information.

8. The combination according to claim 7, wherein:

said logic means are of the type which can continuously provide a control signal representative of last sensed particular one of said frequency deviation standards being utilized in the absence of an output from said first mentioned means.

9. The combination according to claim 7, and further including:

a signal generator for generating control signals corresponding to each of the frequency deviations standard operation conditions; and switching means coupled to said logic means and said third means, said switching means being operable in a first condition to couple the control signal from said logic means to said third means and operable in a second condition to couple the control signals from said signal generator to said third means.